United States Patent [19]

Matsuyama et al.

[11] Patent Number: 4,954,770
[45] Date of Patent: Sep. 4, 1990

[54] SPIN-POLARIZATION DETECTOR

[75] Inventors: Hideo Matsuyama, Kokubunji; Kazuyuki Koike, Tokyo; Kazunobu Hayakawa, Chofu, all of Japan

[73] Assignee: Hitachi, Ltd., Tokyo, Japan

[21] Appl. No.: 310,896

[22] Filed: Feb. 16, 1989

[30] Foreign Application Priority Data

Feb. 26, 1988 [JP] Japan ................................. 63-41991

[51] Int. Cl.$^5$ ............................................. G01N 23/00
[52] U.S. Cl. .................................... 324/71.3; 250/306
[58] Field of Search ............... 324/71.3; 250/306, 305, 250/310

[56] References Cited

U.S. PATENT DOCUMENTS

| | | | |
|---|---|---|---|
| 2,814,730 | 11/1957 | Fechter | 324/71.3 |
| 4,153,844 | 5/1979 | Kirschner | 324/71.3 |
| 4,658,138 | 4/1987 | Koike et al. | 250/310 |
| 4,691,160 | 9/1987 | Ino | 324/71.3 |
| 4,760,254 | 7/1988 | Pierce et al. | 324/71.3 |

FOREIGN PATENT DOCUMENTS

| | | | |
|---|---|---|---|
| 3532781 | 3/1987 | Fed. Rep. of Germany | 250/306 |
| 187281 | 10/1984 | Japan. | |
| 283890 | 12/1986 | Japan | 250/306 |
| 73184 | 4/1987 | Japan | 250/306 |
| 73185 | 4/1987 | Japan | 250/306 |
| 411359 | 6/1983 | U.S.S.R. | 250/306 |

OTHER PUBLICATIONS

Japanese Journal of Applied Physics, vol. 23, No. 3, Mar. 1984, pp. 487–488.

Primary Examiner—Reinhard J. Eisenzopf
Assistant Examiner—Maura K. Regan
Attorney, Agent, or Firm—Antonelli, Terry, Stout & Kraus

[57] ABSTRACT

A spin-polarization detector having in a region applied with a high voltage a target for scattering a measured electron beam and an electron detector for detecting scattered electrons from the target is disclosed, in which a fluorescent screen is used as the electron detector, and a light pulse from the fluorescent screen is transmitted through an optical guide to a photodetector disposed in a region having the ground potential, to be converted into an electric signal. The spin-polarization detector is simple in structure, small in size, and low in manufacturing cost. Further, when a plurality of scattered-electron detecting systems each including the target and the fluorescent screen are piled in a spin-polarization detector, the detection efficiency of the spin-polarization detector will be greatly enhanced.

12 Claims, 3 Drawing Sheets

SPIN-POLARIZATION DETECTOR

BACKGROUND OF THE INVENTION

The present invention relates to improvements in a spin-polarization detector for measuring the spin polarization of an electron beam, and more particularly to a spin-polarization detector which is small in size and high in sensitivity, and which is suited to measure the spin polarization of electrons emitted from a solid body such as secondary electrons, reflected electrons, photoelectrons, thermal electrons, and electrons generated by field emission.

In a Mott detector which is widely used for measuring the spin polarization of an electron beam, it is required to count up electrons which are scattered back from a heavy atom target, in a region applied with a high voltage. Accordingly, in a conventional Mott detector, as described in, for example, Japanese laid-open patent publication No. JP-A-59-187,281 and Japanese Journal of Applied Physics Vol. 23, No. 3 March, 1984 pp. L187–L188, an electron detector, a pre-amplifier, a linear amplifier and a light emitting diode are arranged in a region applied with a high voltage so that one electron incident on the electron detector is converted by the electron detector, the pre-amplifier and the linear amplifier into one electric-pulse and the electric pulse is converted by the light emitting diode into light pulse, the light pulse from the light emitting diode travels through an optical guide to a light receiving element kept at the ground potential, to be converted in an electric pulse, and the electric pulse thus obtained is measured.

Further, in the prior art, a sheet of heavy metal foil is used as a scattering target, and back-scattered electrons from the foil are detected to calculate the spin polarization of an electron beam incident on the foil.

In the above prior art, however, there arise the following problems.

(1) In the high-voltage region, a weak output signal from the electron detector is amplified and shaped, and then converted into the light pulse. Accordingly, it is required to dispose in the high-voltage region an electronic circuit system including the electron detector, the pre-amplifier, the linear amplifier and the light emitting diode. Further, it is necessary to supply electric power to the electronic circuit system disposed in the high-voltage region. Hence, the Mott detector is complicated in structure, high in manufacturing cost, and large in size. Further, owing to the heat generation of each of circuit elements constituting the electronic circuit system, this system has a limited life.

(2) Only one sheet of foil is used as the scattering target. Accordingly, the greater part of an electron beam incident on the foil passes through the foil, and a very small number of electrons are scattered back from the foil, to be received by the electron detector. Thus, the detecting efficiency is not high.

SUMMARY OF THE INVENTION

It is accordingly a first object of the present invention to provide a spin-polarization detector which is simple in structure, low in manufacturing cost and small in size, and which does not generate heat in a high-voltage region.

It is a second object of the present invention to provide spin-polarization detector which is excellent in detecting efficiency.

It is a third object of the present invention to provide a spin-polarization detector which is simple in structure, low in manufacturing cost and small in size, which does not generate heat in a high-voltage portion, and which is excellent in detecting efficiency.

In order to attain the first object, according to an aspect of the present invention, there is provided a spin-polarization detector, in which a fluorescent screen is used in place of a conventional electron detector and disposed in a high-voltage region so that the electron receiving surface of the fluorescent screen confronts a heavy atom target, an end of an optical guide (for example, an optical fiber) is bonded to the back surface of the fluorescent screen opposite to the electron receiving surface, and the other end of the optical guide is led to a photoelectric conversion element disposed in a region having the ground potential, to detect light pulse passing through the optical guide. In more detail, when one electron is incident on the fluorescent screen, one light pulse is emitted from the fluorescent screen, and part of the light pulse is sent by the optical guide from the high-voltage region to the ground-potential region The light pulse having passed through the optical guide is converted by the photoelectric conversion element attached to the other end of the optical guide into an amplified electric signal. That is, the electron scattered back from the heavy atom target is converted by the fluorescent screen into light pulse, which travels through the optical guide to the ground-potential region. Accordingly, it is not required to form an electronic circuit system in the high-voltage region and to supply electric power to the system. Hence, the spin-polarization detector is simple in structure, low in manufacturing cost, and small in size.

In order to attain the second object, according to another aspect of the present invention, there is provided a spin-polarization detector, in which attention is paid to a fact that the electron beam having passed through metal foil is almost equal in intensity and is equal in spin polarization to the electron beam incident on the metal foil, and a plurality of scattered-electron detecting systems are arranged along the traveling direction of a measured electron beam so that the electron beam passes through a plurality of metal targets.

In the above spin-polarization detector, the scattered-electron detecting systems are substantially equal in detecting efficiency. Accordingly, the detecting efficiency of the spin-polarization detector is a plurality of times greater than that of each detecting system.

In order to attain the third object, a spin-polarization detector according to a further aspect of the present invention includes both means for attaining the first object and means for attaining the second object.

Other objects, features and advantages of the present invention will become apparent from the following detailed description taken in conjunction with the accompanying drawings.

DESCRIPTION OF THE PREFERRED EMBODIMENTS

Embodiments of the present invention will be explained below in detail, with reference to the drawings.

Figure 1:
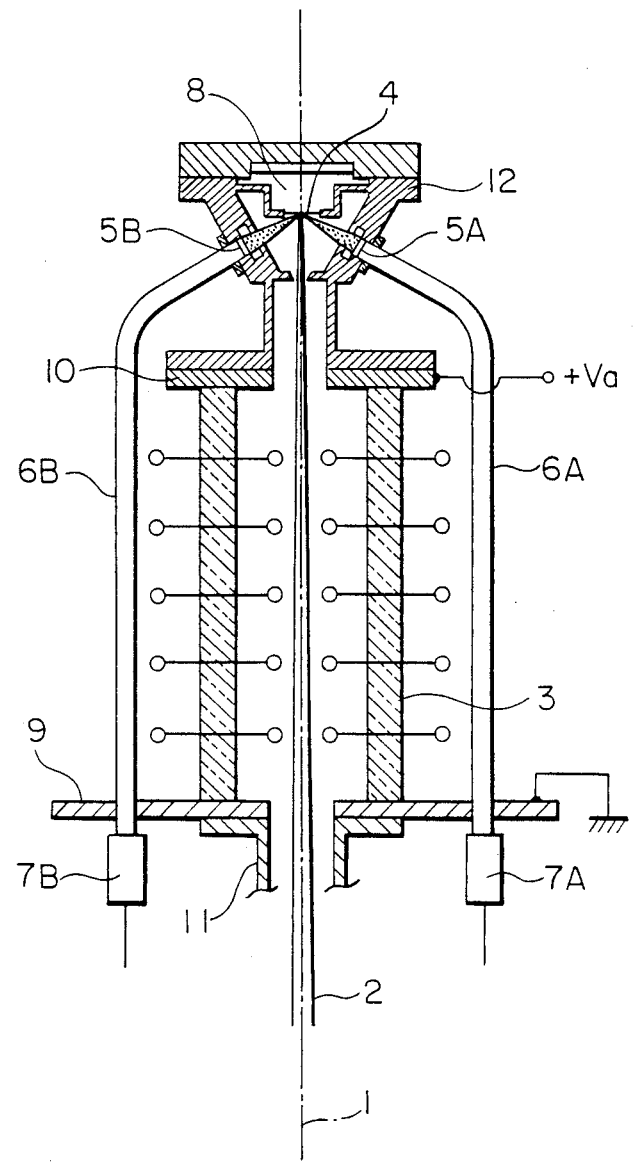
FIG. 1 is a longitudinal sectional view showing a first embodiment of a spin-polarization detector according to the present invention.

FIG. 1 shows a first embodiment of a spin-polarization detector according to the present invention. Referring to FIG. 1, a measured electron beam 2 travels from a lower portion of FIG. 1 into an acceleration tube 3 along the center axis 1 of a spin-polarization detector (namely, the present embodiment). The acceleration tube 3 has the form of a cylinder, and the axis of the acceleration tube 3 coincides with the center axis of the spin-polarization detector. The inside of the acceleration tube 3 is evacuated through a vacuum pipe 11. The electron beam 2 traveling along the center axis 1 is accelerated by an accelerating voltage Va applied to an electrode member 10, so as to have a kinetic energy of about 120 KeV. The accelerated electron beam impinges on a heavy atom target (for example, heavy metal foil) 4, and is scattered from the target 4. Electrons scattered back from the target 4 in directions which make an angle of about 120° with the center axis 1 on the right and left sides thereof, impinge on fluorescent screens 5A and 5B. When one electron impinges on the fluorescent screen 5A or 5B, one light pulse is generated in the fluorescent screen. The fluorescent screens 5A and 5B are made in such a manner that a thin fluorescent film is formed on the surface of a circular glass plate coated with a transparent, conductive material, and a thin aluminum layer is deposited on the fluorescent film. The light pulse generated in the fluorescent screen 5A or 5B is directly led to an optical guide 6A or 6B, or the light pulse reflected from the aluminum layer is led to the optical guide 6A or 6B. Upper ends of the optical guides 6A and 6B are bonded to the back surfaces of the fluorescent screens 5A and 5B, respectively, and lower ends of the optical guides 6A and 6B are led to a member 9 kept at the ground potential, to be coupled with photo-multipliers 7A and 7B, respectively. That is, light pulses generated in the fluorescent screens 5A and 5B are led to the photomultipliers 7A and 7B through the optical guides 6A and 6B, respectively, to be amplified and converted in electric signals. The electric signals thus obtained are detected to determine the spin polarization of the electron beam 2. Each of the optical guides 6A and 6B is formed of a bundle of optical fibers, or formed of a glass rod. Further, the heavy atom target 4, the fluorescent screens 5A and 5B, and the upper ends of the optical guides 6A and 6B are fixed to a vacuum vessel 12 for forming a scattering chamber 8. The vacuum vessel 12 is illustrated in FIG. 1 as a metallic member contacting the electrode 10 and which serves for applying the accelerating voltage Va to the fluorescent screens. Since the metal target 4 is also connected with the vacuum vessel 12, as illustrated, the metal target and fluorescent screens have the same voltage applied thereto.

In a modified version of the first embodiment, a fluorescent film is formed on the upper ends of the optical guides 6A and 6B. In this case, the fluorescent screens 5A and 5B are omitted, and thus the size and manufacturing cost of the spin-polarization detector are greatly reduced.

Figure 2:
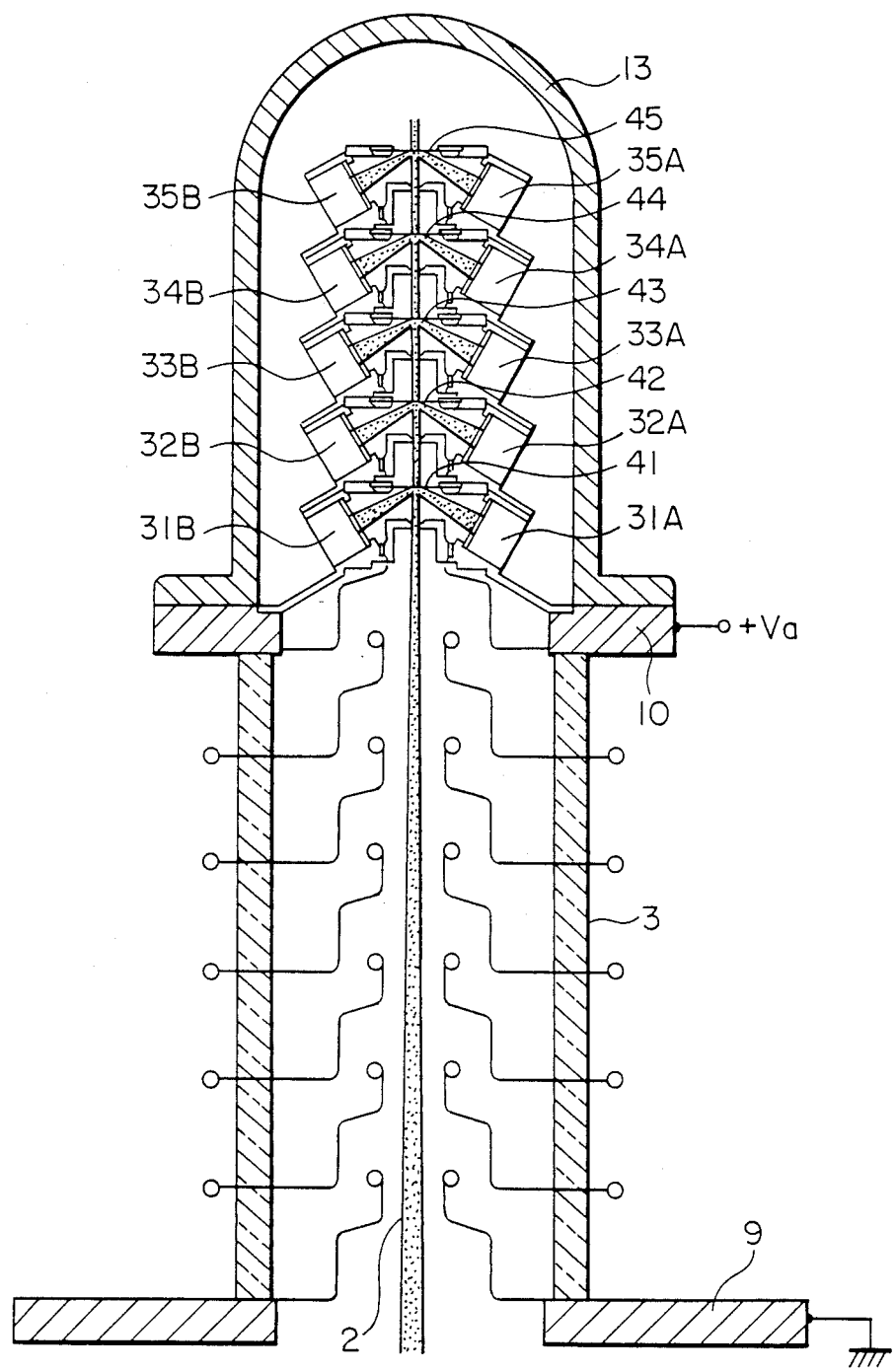
FIG. 2 is a longitudinal sectional view showing a second embodiment of a spin-polarization detector according to the present invention.

FIG. 2 shows a second embodiment of a spin-polarization detector according to the present invention. Referring to FIG. 2, the measured electron beam 2 is accelerated by the acceleration tube 3 so as to have a kinetic energy of 100 KeV, and the accelerated electron beam impinges on a heavy atom target 41 disposed in a vacuum vessel 13. Electrons scattered back from the target 41 in directions which make an angle of 120° with the center axis of the electron beam 2 on right, left, front and rear sides of the electron beam 2, are detected by four electron detectors 31A, 31B, 31C and 31D. The electron detectors 31A, 31B, 31C and 31D are disposed so that a rotation of 90° about the center axis of the electron beam 2 brings four electron detectors in coincidence with four original positions. Incidentally, the electron detectors 31C and 31D which are disposed on front and rear sides of the electron beam 2, are not shown in FIG. 2. The heavy atom target 41 can transmit more than 95 percent of the electron beam incident on the target 41, and the transmitted electron beam is equal in spin polarization to the incident electron beam. Accordingly, the transmitted electron beam can be used for the measurement of spin polarization. In view of this fact, four scattered-electron detecting systems, each of which is the same as the first scattered-electron detecting system made up of the target 41 and the electron detectors 31A to 31D, are piled on the first detecting system, to make the amount of output signal of the spin-polarization detector five times larger than the amount of output signal of the first detecting system. That is, the present embodiment is five times higher in detecting efficiency than the conventional spin-polarization detector. In FIG. 2, reference numerals 42 to 45 designate heavy atom targets straightly aligned one behind another and included in the second to fifth scattered-electron detecting systems, and reference symbols 32A to 35A and 32B to 35B designate electron detectors included in the second to fifth scattered-electron detecting systems.

Further, when one of the heavy atom targets 41 to 45 is replaced by aluminum foil having relatively small atomic weight, the instrumental asymmetry can be detected, together with the spin polarization of the electron beam 2.

Figure 3:
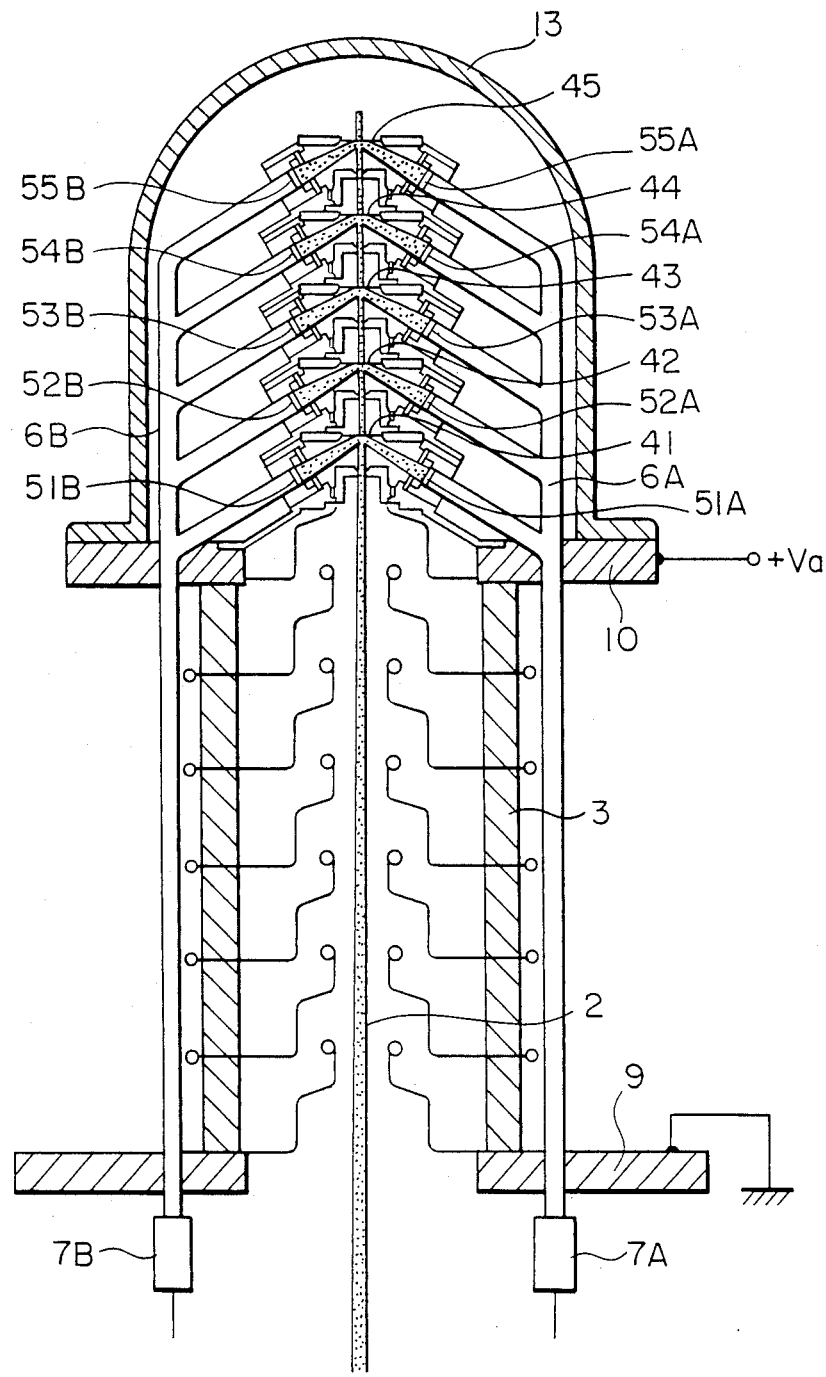
FIG. 3 is a longitudinal sectional view showing a third embodiment of a spin-polarization detector according to the present invention.

Next, explanation will be made of a third embodiment of a spin-polarization detector according to the present invention, with reference to FIG. 3. Referring to FIG. 3, the characteristic features of the present embodiment reside in that five detection stages each made up of a heavy atom target, a pair of fluorescent screens and a pair of optical guides are arranged along the center line of the embodiment, five optical guides formed on the left or right side of the center line are led to a main optical guide 6A or 6B, and lower ends of the main optical guides 6A and 6B are led to member 9 kept at the ground potential, to be coupled with photomultipliers 7A and 7B. In more detail, a first detection stage including the heavy atom target 41 and fluorescent screens 51A and 51B, a second detection stage including the target 42 and fluorescent screens 52A and 52B, a third detection stage including the target 43 and fluorescent screens 53A and 53B, a fourth detection stage including the target 44 and fluorescent screens 54A and 54B, and a fifth detection stage including the target 45 and fluorescent screens 55A and 55B, are piled so that the positional relation at one stage among a heavy atom target, a pair of fluorescent screens and a pair of optical guides, is equal to the above positional relation at another stage. As has been described in the explanation of the second embodiment, each heavy atom target can transmit more than 95 percent of the electron beam incident thereon, and the transmitted electron beam is equal in spin polarization to the incident electron beam. Thus, the scattering process at one of the first to fifth detection stages, will qualitatively and quantitatively be nearly equal to the scattering process at another detection stage. Hence, according to the present embodiment, the number of electric pulses which are detected by the photomultipliers 7A and 7B in a unit time, is about five times larger than that obtained by one detection stage. That is, the present embodiment is about five times larger in detecting efficiency than a spin-polarization detector having only one detection stage. Further, according to the present embodiment, it is unnecessary to provide electronic devices such as an amplifier, in a high-voltage region.

According to the present embodiment, only by piling five detection stages each made up of a heavy atom target, a pair of fluorescent screens and a pair of optical guides, the detecting efficiency is made five times larger than that of a spin-polarization detector having one detection stage. That is, a spin-polarization detector can be obtained which is small in size, low in manufacturing cost, and excellent in detecting efficiency.

As has been explained in the foregoing, according to an aspect of the present invention, there is provided a spin-polarization detector which is small in size and low in manufacturing cost, and which does not generate heat in a region applied with a high voltage. According to another aspect of the present invention, there is provided a spin-polarization detector which is excellent in detecting efficiency. Further, according to a further aspect of the present invention, there is provided a spin-polarization detector which is small in size and excellent in detecting efficiency.

We claim:

1. A spin-polarization detector comprising:
   acceleration means applying a high voltage for accelerating a measured electron beam having spin polarization;
   a metal target for scattering the accelerated electron beam; and
   a fluorescent screen for detecting the intensity of an electron beam scattered from the metal target, and optical signal from the fluorescent screen being transmitted to photoelectric conversion means through an optical guide, to be converted into an electric signal,
   wherein the fluorescent screen is disposed in a region which exists in the neighborhood of the metal target and is supplied with said high voltage by means of the acceleration means, the fluorescent screen and the metal target being applied with said high voltage, and wherein the photoelectric conversion means is disposed in a region applied with a ground potential.

2. A spin-polarization detector according to claim 1, wherein the fluorescent screen and the metal target are disposed in a vacuum vessel.

3. A spin-polarization detector comprising:
   acceleration means for accelerating a measured electron beam having spin polarization;
   a plurality of metal targets straightly aligned one behind another along the traveling direction of the measured electron beam for scattering the accelerated electron beam; and
   a plurality of detection means arranged along the traveling direction of the measured electron beam for detecting the intensities of electron beams scattered from the metal targets.

4. A spin-polarization detector according to claim 3, wherein at least one of the metal targets is formed of heavy metal foil.

5. A spin-polarization detector according to claim 3, wherein at least one of the metal targets is formed of light metal foil.

6. A spin-polarization detector according to claim 3, wherein the plurality of metal targets and the plurality of detection means are arranged in a vacuum vessel.

7. A spin-polarization detector according to claim 3, wherein respective ones of said plurality of detection means are arranged for detecting the intensities of electron beams scattered from respective ones of the metal targets so as to enable and improve efficiency in detection of the spin-polarization of the measured electron beam.

8. A spin-polarization detector comprising:
   acceleration means for accelerating a measured electron beam having spin polarization;
   a plurality of metal targets straightly aligned one behind another along the traveling direction of the measured electron beam for scattering the accelerated electron beam; and
   a plurality of fluorescent screens arranged along the traveling direction of the measured electron beam for detecting the intensities of electron beams scattered from the metal targets, an optical signal from each fluorescent screen being transmitted to photoelectric conversion means through an optical guide, to be converted into an electric signal.

9. A spin-polarization detector according to claim 8, wherein the plurality of metal targets and the plurality of fluorescent screens are arranged in a vacuum vessel.

10. A spin-polarization detector according to claim 8, wherein respective ones of the plurality of fluorescent screens are arranged for detecting the intensities of electron beams scattered from respective ones of the metal targets, the photoelectric conversion means being associated with a plurality of the fluorescent screens through the optical guide so as to provide an electric signal of increased output to improve efficiency in detection of the spin-polarization of the measured electron beam.

11. A spin-polarization detector comprising:
   acceleration means applying a high voltage for accelerating an electron beam to be measured, from a ground potential region towards a high voltage region;
   a metal target for scattering the accelerated electron beam, said metal target being disposed in said high voltage region and being applied with said high voltage by said acceleration means;
   a fluorescent screen for detecting the scattered electron beam from said metal target and outputting an optical signal, said fluorescent screen being disposed in said high voltage region and being applied with said high voltage as applied to said metal target by said acceleration means;
   photoelectric conversion means for converting an inputted optical signal into an electric output signal, said photoelectric conversion means being disposed in said ground potential region; and an optical guide for transmitting the optical output signal from said fluorescent screen to said photoelectric conversion means.

12. A spin-polarization detector according to claim 11, wherein one end of said optical guide is disposed in said high voltage region and optically coupled with said fluorescent screen, and another end of said optical guide is disposed in said ground potential region and optically coupled with said photoelectric conversion means.

* * * * *